(12) United States Patent
Fujimoto

(10) Patent No.: US 10,203,921 B2
(45) Date of Patent: Feb. 12, 2019

(54) DISPLAY CONTROL DEVICE, DISPLAY CONTROL METHOD, AND IMAGE FORMING APPARATUS THAT DISPLAY PREVIEW IMAGES ACCORDING TO OPERATION RECEIVED THROUGH TOUCH SENSOR

(71) Applicant: KYOCERA Document Solutions Inc., Osaka (JP)

(72) Inventor: Norie Fujimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/917,868

(22) Filed: Mar. 12, 2018

(65) Prior Publication Data

US 2018/0275933 A1 Sep. 27, 2018

(30) Foreign Application Priority Data

Mar. 23, 2017 (JP) ................................. 2017-056858

(51) Int. Cl.
*G06F 3/12* (2006.01)
*H04N 1/00* (2006.01)

(52) U.S. Cl.
CPC .......... *G06F 3/1256* (2013.01); *G06F 3/1205* (2013.01); *G06F 3/1285* (2013.01); *H04N 1/00411* (2013.01); *H04N 1/00448* (2013.01)

(58) Field of Classification Search
None
See application file for complete search history.

(56) References Cited

U.S. PATENT DOCUMENTS

| | | |
|---|---|---|
| 6,927,865 B1 | 8/2005 | Kujirai et al. |
| 7,609,401 B2 | 10/2009 | Kujirai et al. |
| 8,009,303 B2 | 8/2011 | Kujirai et al. |
| 8,497,999 B2 | 7/2013 | Kujirai et al. |
| 2005/0206953 A1 | 9/2005 | Kujirai et al. |
| 2010/0064211 A1 | 3/2010 | Kujirai et al. |
| 2011/0261377 A1* | 10/2011 | Kujirai .................. G06F 3/1208 358/1.9 |
| 2011/0317195 A1* | 12/2011 | Mitsui .................. G06F 3/0483 358/1.13 |

FOREIGN PATENT DOCUMENTS

JP 2007-250002 A 9/2007

* cited by examiner

*Primary Examiner* — Andrew H Lam
(74) *Attorney, Agent, or Firm* — Studebaker & Brackett PC

(57) ABSTRACT

An image forming apparatus displays preview images representing respective images to be formed on a front side and a back side of paper P. The image forming apparatus includes a display, a display section, a receiving section, and an instruction section. The display section causes the display to display a front-side preview image representing a front-side image to be formed on the front side of the paper. The receiving section receives a specific operation. The instruction section forms the front-side image on the front side of the paper and forms a back-side image on the back side of the paper. When the receiving section receives the specific operation, the display section causes the display to display a back-side preview image representing the back-side image as seen from the front side of the paper through the paper.

8 Claims, 6 Drawing Sheets

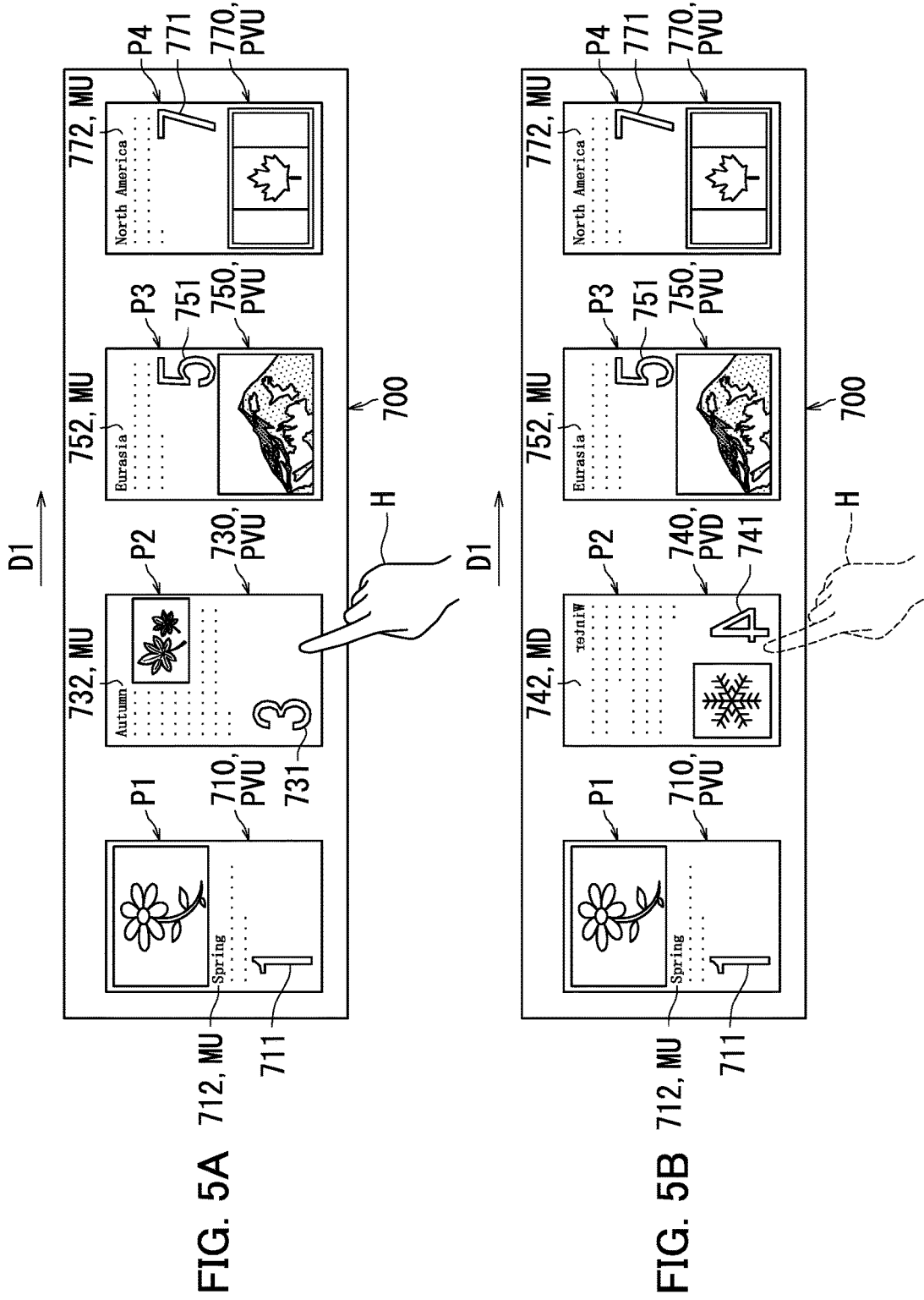

DISPLAY CONTROL DEVICE, DISPLAY CONTROL METHOD, AND IMAGE FORMING APPARATUS THAT DISPLAY PREVIEW IMAGES ACCORDING TO OPERATION RECEIVED THROUGH TOUCH SENSOR

INCORPORATION BY REFERENCE

The present application claims priority under 35 U.S.C. § 119 to Japanese Patent Application No. 2017-056858, filed on Mar. 23, 2017. The contents of this application are incorporated herein by reference in their entirety.

BACKGROUND

The present disclosure relates to a display control device that causes a display to display a preview image, a display control method, and an image forming apparatus.

A print system includes a host computer and a printer. The host computer includes a previewer. The previewer causes a display to display a preview image. Specifically, when images are to be formed on respective opposite sides of paper, the previewer causes a front-side image and a back-side image to be displayed in a superimposed manner. The front-side image is an image to be formed on a front side of the paper. The back-side image is an image to be formed on a back side of the paper.

SUMMARY

A display control device of the present disclosure displays preview images representing respective images to be formed on a front side and a back side of a recording medium. The display control device includes a display, a display section, and a receiving section. The display section causes the display to display a front-side preview image representing a front-side image to be formed on the front side of the recording medium. The receiving section receives a specific operation. When the receiving section receives the specific operation, the display section causes the display to display a back-side preview image representing a back-side image to be formed on the back side of the recording medium, instead of the front-side preview image. The back-side preview image represents the back-side image as seen from the front side of the recording medium through the recording medium.

A display control method of the present disclosure is a method for displaying preview images representing respective images to be formed on a front side and a back side of a recording medium. The display control method includes: causing a display to display a front-side preview image; receiving a specific operation; and causing the display to display a back-side preview image. In the causing a display to display a front-side preview image, the display is caused to display the front-side preview image representing a front-side image to be formed on the front side of the recording medium. In the receiving a specific operation, the specific operation is received. In the causing the display to display a back-side preview image, after the receiving a specific operation, the display is caused to display the back-side preview image representing a back-side image to be formed on the back side of the recording medium, instead of the front-side preview image. The back-side preview image represents the back-side image as seen from the front side of the recording medium through the recording medium.

An image forming apparatus of the present disclosure displays preview images representing respective images to be formed on a front side and a back side of a recording medium. The image forming apparatus includes a display, a display section, a receiving section, and an image forming device. The display section causes the display to display a front-side preview image representing a front-side image to be formed on the front side of the recording medium. The receiving section receives a specific operation. When the receiving section receives the specific operation, the display section causes the display to display a back-side preview image representing a back-side image to be formed on the back side of the recording medium, instead of the front-side preview image. The back-side preview image represents the back-side image as seen from the front side of the recording medium through the recording medium. The image forming device forms the front-side image on the front side of the recording medium and forms the back-side image on the back side of the recording medium.

BRIEF DESCRIPTION OF THE DRAWINGS

FIG. 4A is a screen diagram illustrating an example of a front-side preview image. FIG. 4B is a screen diagram illustrating an example of a back-side preview image.

FIGS. 5A and 5B are diagrams each illustrating an example of a preview screen for plural sheets of paper. FIG. 5A is a screen diagram illustrating an example of front-side preview images. FIG. 5B is a screen diagram illustrating an example of front-side preview images and a back-side preview image.

DETAILED DESCRIPTION

Figure 1:
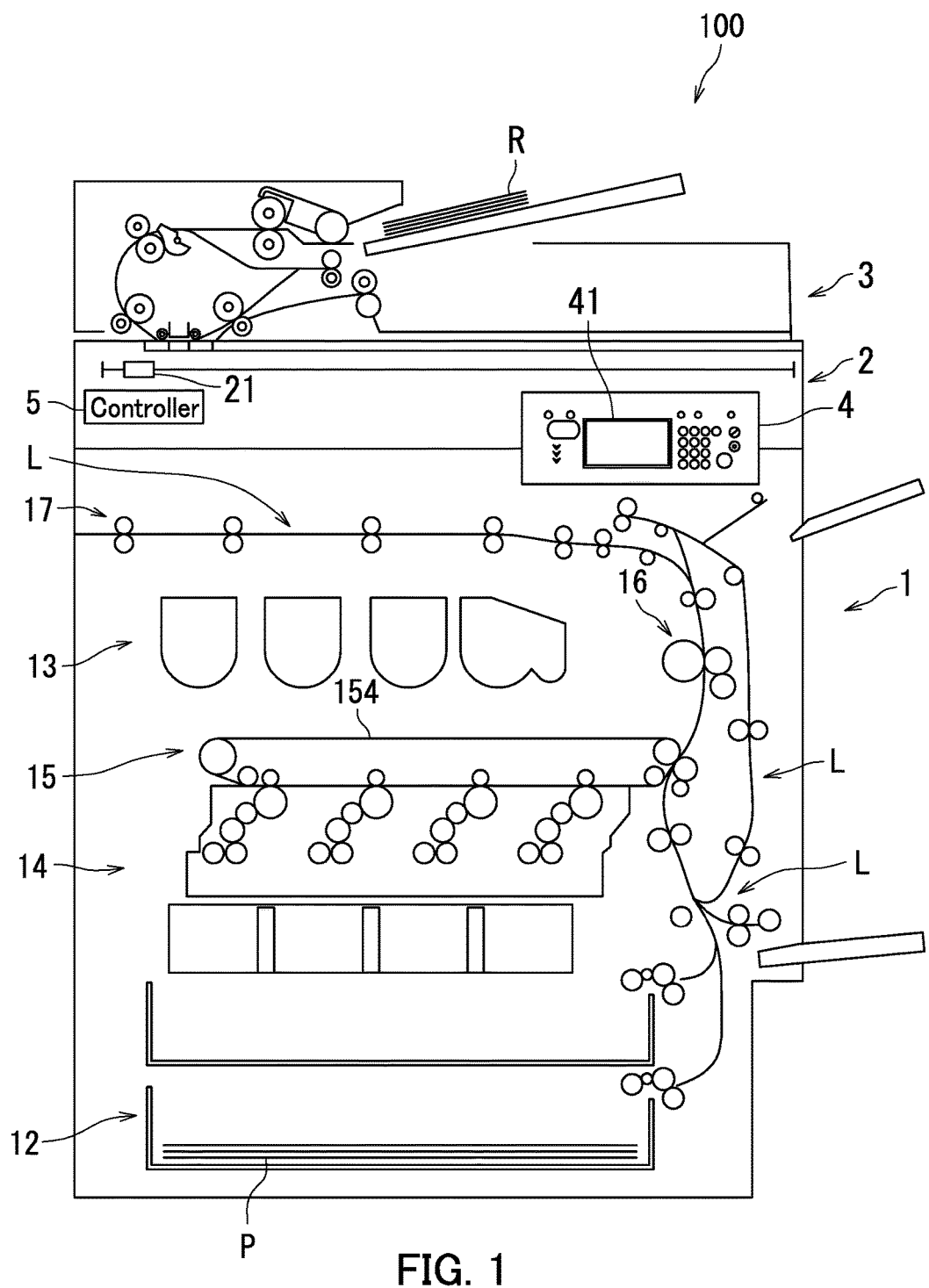
FIG. 1 is a diagram illustrating an example of a configuration of an image forming apparatus according to an embodiment of the present disclosure.

The following describes an embodiment of the present disclosure with reference to the drawings (FIGS. 1 to 6). In the drawings, elements that are the same or substantially equivalent are labelled using the same reference signs, and explanation of which will not be repeated.

First, a configuration of an image forming apparatus 100 according to the embodiment of the present disclosure will be described with reference to FIG. 1. FIG. 1 is a diagram illustrating the configuration of the image forming apparatus 100. As illustrated in FIG. 1, the image forming apparatus 100 is a multifunction peripheral. The image forming apparatus 100 includes an image forming unit 1, an image reading unit 2, a document conveyance unit 3, an operation display section 4, and a controller 5.

The image forming unit 1 forms an image on paper P. The image reading unit 2 reads an image of a document R. The document conveyance unit 3 feeds the document R to the image reading unit 2. The operation display section 4 receives a user operation and displays various information. The controller 5 controls operation of the image forming apparatus 100.

The image forming unit 1 includes a feeding section 12, a conveyance section L, a toner supply section 13, an image forming section 14, a fixing section 16, and an ejection section 17. The image forming section 14 includes a transfer section 15. The image forming unit 1 is an example of an "image forming device".

The feeding section 12 feeds paper P to the conveyance section L. The conveyance section L conveys the paper P through the transfer section 15 and the fixing section 16 to the ejection section 17. The paper P is an example of a "recording medium".

The toner supply section 13 supplies toner to the image forming section 14. The image forming section 14 forms an image on the paper P.

The transfer section 15 includes an intermediate transfer belt 154. The image forming section 14 transfers toner images in respective colors of cyan, magenta, yellow, and black onto the intermediate transfer belt 154. The toner images in the respective colors are superimposed on one another on the intermediate transfer belt 154, whereby an image is formed on the intermediate transfer belt 154. The transfer section 15 transfers the formed image from the intermediate transfer belt 154 onto the paper P. Through the above, the image is formed on the paper P.

The fixing section 16 applies heat and pressure to the paper P to fix to the paper P the image formed on the paper P. The ejection section 17 ejects the paper P out of the image forming apparatus 100.

The image reading unit 2 includes an image reading section 21. The image reading section 21 is a contact image sensor (CIS) unit which is an integrated assembly of a light emitting diode (LED), a contact glass, an imaging lens, and an image sensor.

The operation display section 4 includes a touch panel 41.

Figure 2:
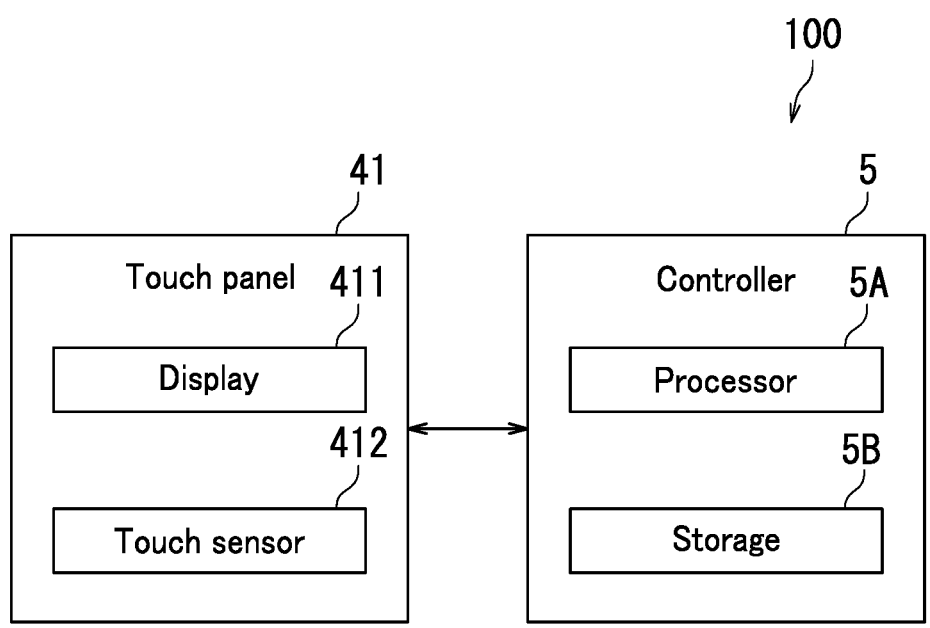
FIG. 2 is a diagram illustrating an example of a configuration of main parts of the image forming apparatus.

The following describes a configuration of main parts of the image forming apparatus 100 with reference to FIGS. 1 and 2. FIG. 2 is a diagram illustrating an example of the configuration of the main parts of the image forming apparatus 100. As illustrated in FIG. 2, the touch panel 41 includes a display 411 and a touch sensor 412. The display 411 includes for example a liquid crystal display (LCD), and displays various images. The touch sensor 412 receives a user operation. The touch sensor 412 is disposed for example over a display surface of the display 411.

The controller 5 includes a processor 5A and storage 5B. The processor 5A includes for example a central processing unit (CPU). The storage 5B includes a memory such as a semiconductor memory, and may include a hard disk drive (HDD). The storage 5B stores therein control programs. The processor 5A functions as various functional sections through execution of the control programs.

The touch panel 41 and the controller 5 constitute a "display control device".

Figure 3:
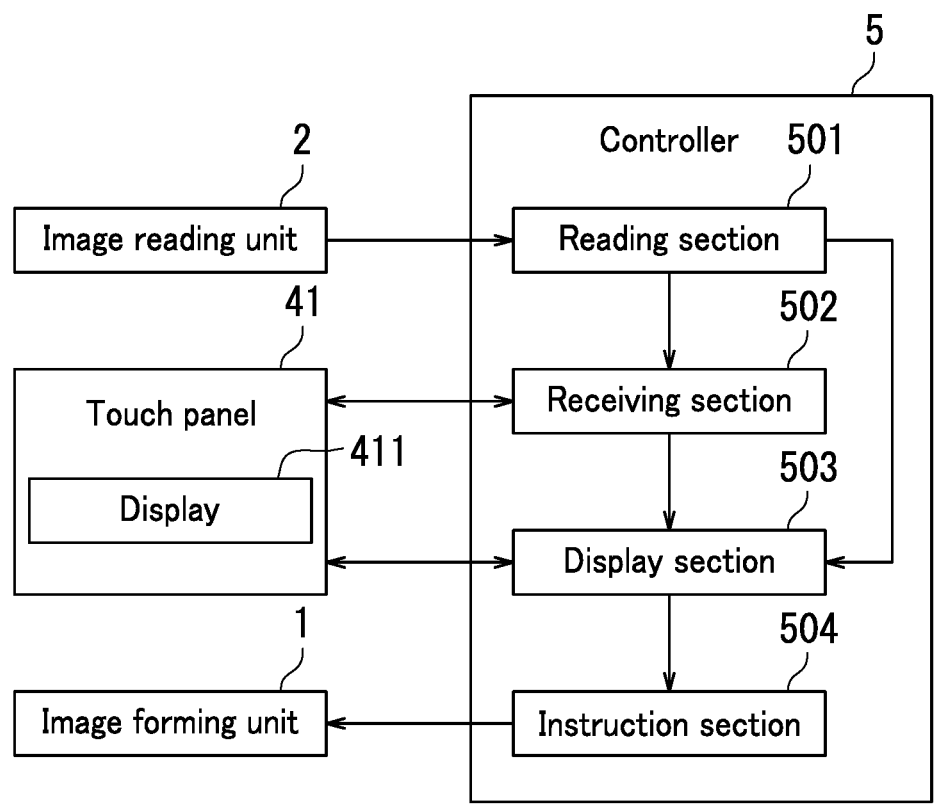
FIG. 3 is a diagram illustrating an example of a configuration of a controller according to the embodiment of the present disclosure.

The following describes a configuration of the controller 5 according to the embodiment of the present disclosure with reference to FIGS. 1 to 3. FIG. 3 is a diagram illustrating the configuration of the controller 5. As illustrated in FIG. 3, the controller 5 includes a reading section 501, a receiving section 502, a display section 503, and an instruction section 504. Specifically, the processor 5A functions as the reading section 501, the receiving section 502, the display section 503, and the instruction section 504 through execution of the control programs.

The reading section 501 reads an image of the document R through the image reading unit 2 to generate image information MJ. The embodiment of the present disclosure describes a situation in which an image is present on one of opposite sides of each sheet of the document R. Specifically, the reading section 501 reads an image of the first sheet of the document R to generate first image information M1J. Also, the reading section 501 reads an image of the second sheet of the document R to generate second image information M2J.

The receiving section 502 receives a "first operation" through the touch panel 41. The "first operation" is for example a long press operation OP.

The display section 503 causes the display 411 to display a front-side preview image PVU. The front-side preview image PVU represents a front-side image MU to be formed on a front side of the paper P. The front-side image MU corresponds to the first image information M1J.

When the receiving section 502 receives the long press operation OP, the display section 503 causes the display 411 to display a back-side preview image PVD instead of the front-side preview image PVU. The back-side preview image PVD represents a back-side image MD to be formed on a back side of the paper P. The back-side image MD corresponds to the second image information M2J.

The instruction section 504 instructs the image forming unit 1 to form the front-side image MU on the front side of the paper P and form the back-side image MD on the back side of the paper P.

As described above with reference to FIGS. 1 to 3, when the receiving section 502 receives the long press operation OP, the display section 503 causes the display 411 to display the back-side preview image PVD instead of the front-side preview image PVU in the embodiment of the present disclosure. Therefore, the user can check the front-side preview image PVU and the back-side preview image PVD separately. As a result, when images are to be formed on respective opposite sides of the paper P, it can be confirmed whether or not the images are to be formed as intended by the user by checking the front-side preview image PVU and the back-side preview image PVD.

Although the "first operation" in the embodiment of the present disclosure is the long press operation OP, the present disclosure is not limited to this configuration. It is only required that the "first operation" is a user operation. The "first operation" may for example be a force touch operation.

Also, the front-side image MU corresponds to the first image information M1J and the back-side image MD corresponds to the second image information M2J in the embodiment of the present disclosure. However, the present disclosure is not limited to this configuration. It is only required that the front-side image MU is formed on the front side of the paper P and the back-side image MD is formed on the back side of the paper P. In an alternative configuration, for example at least one of the front-side image MU and the back-side image MD may correspond to image information MJ read by the image forming apparatus 100 from an external device. The external device is for example a personal computer communicatively connected to the image forming apparatus 100.

Figure 4A:
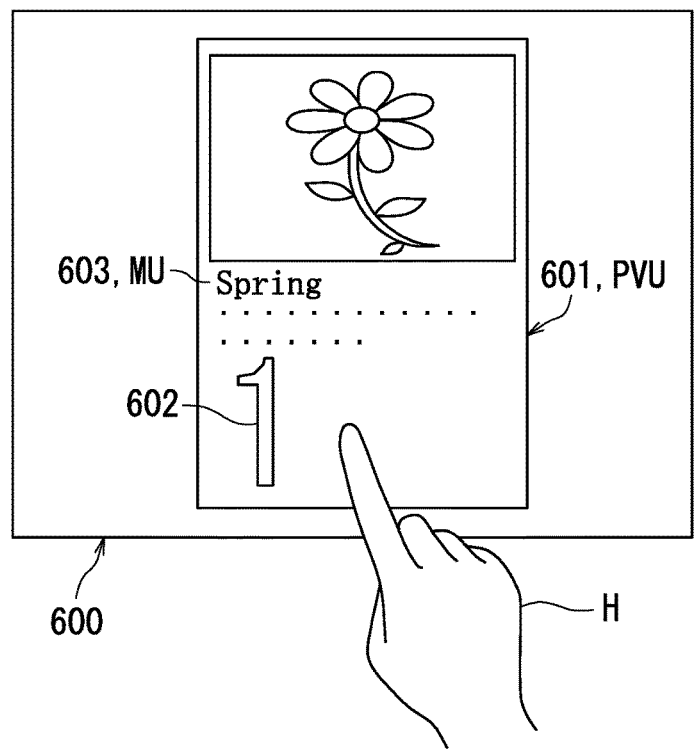
FIGS. 4A and 4B are diagrams each illustrating an example of a preview screen.
Figure 4B:
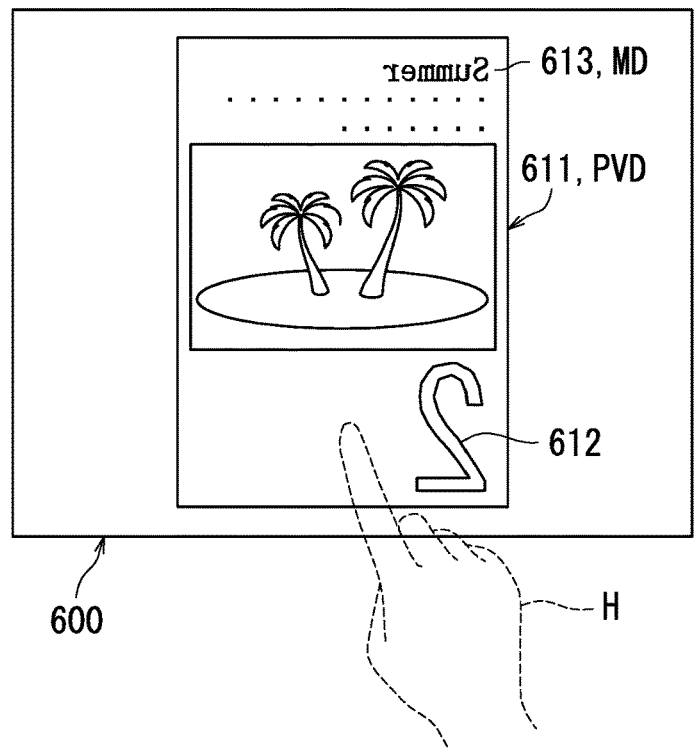

The following further describes the configuration of the controller 5 with reference to FIGS. 1 to 4B. FIGS. 4A and 4B are diagrams each illustrating an example of a preview screen 600. FIG. 4A is a screen diagram illustrating an example of the front-side preview image PVU. FIG. 4B is a screen diagram illustrating an example of the back-side preview image PVD.

The following describes with reference to FIGS. 4A and 4B a situation in which two pieces of image information are generated by reading two sheets of the document R. Specifically, the reading section 501 generates first image information M1J by reading an image of the first sheet of the document R. Also, the reading section 501 generates second image information M2J by reading an image of the second sheet of the document R. A front-side image MU corresponding to the first image information M1J is to be formed on the front side of the paper P, and a back-side image MD corresponding to the second image information M2J is to be formed on the back side of the paper P.

As illustrated in FIG. 4A, a front-side preview image 601 is displayed on the preview screen 600. The front-side preview image 601 includes a page number image 602 and a document image 603.

The page number image 602 is an image representing "1" and indicates that the front-side preview image 601 corresponds to the image of the first sheet of the document R. The document image 603 represents a title "Spring". The document image 603 is an example of the front-side image MU.

When the user performs the long press operation OP on the front-side preview image 601 for example with the forefinger of a user's hand H, the receiving section 502 receives the long press operation OP. Then, the display section 503 causes the display 411 to display a back-side preview image PVD instead of the front-side preview image PVU. Note that the back-side preview image PVD represents the back-side image MD as seen from the front side of the paper P through the paper P.

As a result, a back-side preview image 611 is displayed on the preview screen 600 as illustrated in FIG. 4B. The back-side preview image 611 is an example of the back-side preview image PVD. The back-side preview image 611 includes a page number image 612 and a document image 613.

The page number image 612 is an image representing "2" and indicates that the back-side preview image 611 corresponds to the image of the second sheet of the document R. The document image 613 represents a title "Summer". The document image 613 is an example of the back-side image MD.

The back-side preview image 611 represents the back-side image MD as seen from the front side of the paper P through the paper P. Therefore, the page number image 612 and the document image 613 represent "mirrored characters". The "mirrored characters" are characters inverted horizontally rather than vertically as compared with normal characters. As well as the characters, arrangement of elements of the back-side preview image 611 is also mirrored. Specifically, the back-side preview image 611 represents the back-side image MD inverted horizontally rather than vertically.

When the user removes for example the forefinger of the hand H from the back-side preview image 611, the receiving section 502 receives termination of the long press operation OP. Then, the display section 503 causes the display 411 to display the front-side preview image PVU instead of the back-side preview image PVD. As a result, the front-side preview image 601 illustrated in FIG. 4A is displayed on the preview screen 600.

As described above with reference to FIGS. 1 to 4B, the back-side preview image PVD in the embodiment of the present disclosure represents the back-side image MD as seen from the front side of the paper P through the paper P. Therefore, when images are to be formed on respective opposite sides of the paper P, it is possible to check a state of the back-side image MD formed on the paper P. Through the above, it can be confirmed accurately whether or not the images are to be formed as intended by the user. For example, it can be confirmed whether or not a space sufficient for stapling is to be left at the left end of the paper P where the user intends to staple after the images are formed on the paper P.

Also, the receiving section 502 receives the long press operation OP as a specific operation through the touch sensor 412. Therefore, the user can check the back-side preview image PVD by performing the long press operation OP. Thus, the back-side preview image PVD can be checked easily.

Further, when the receiving section 502 receives termination of the long press operation OP, the display section 503 causes the display 411 to display the front-side preview image PVU. Therefore, the user can cause the display 411 to display the front-side preview image PVU by terminating the long press operation OP. Thus, the front-side preview image PVU and the back-side preview image PVD can be checked easily.

The display section 503 causes the display 411 to display the front-side preview image PVU instead of the back-side preview image PVD when the receiving section 502 receives termination of the long press operation OP in the embodiment of the present disclosure. However, the present disclosure is not limited to this configuration. It is only required that the display section 503 causes the display 411 to display the front-side preview image PVU instead of the back-side preview image PVD when the receiving section 502 receives an operation. The operation that the receiving section 502 receives may be the long press operation OP or any other operation.

The following further describes the configuration of the controller 5 with reference to FIGS. 1 to 5B. FIGS. 5A and 5B are diagrams each illustrating an example of a preview screen 700. FIG. 5A is a screen diagram illustrating an example of front-side preview images PVU. FIG. 5B is a screen diagram illustrating an example of front-side preview images PVU and a back-side preview image PVD.

The following describes with reference to FIGS. 5A and 5B a situation in which eight pieces of image information are generated by reading eight sheets of the document R. The reading section 501 generates four pieces of image information MJ by reading respective images of the first, third, fifth, and seventh sheets of the document R. Then, images corresponding to the respective pieces of image information MJ are each formed on a front side of a sheet of the paper P. Also, the reading section 501 generates four pieces of image information MJ by reading respective images of the second, fourth, sixth, and eighth sheets of the document R. Then, images corresponding to the respective pieces of image information MJ are each formed on a back side of a sheet of the paper P. That is, the respective pieces of image information MJ of the first, third, fifth, and seventh sheets of the document R correspond to front-side images MU, and the respective pieces of image information MJ of the second, fourth, sixth, and eighth sheets of the document R correspond to back-side images MD.

The front-side image MU corresponding to the first sheet of the document R and the back-side image MD corresponding to the second sheet of the document R are to be formed on the first sheet of the paper P. The front-side image MU corresponding to the third sheet of the document R and the back-side image MD corresponding to the fourth sheet of the document R are to be formed on the second sheet of the paper P. The front-side image MU corresponding to the fifth sheet of the document R and the back-side image MD corresponding to the sixth sheet of the document R are to be formed on the third sheet of the paper P. The front-side image MU corresponding to the seventh sheet of the document R and the back-side image MD corresponding to the eighth sheet of the document R are to be formed on the fourth sheet of the paper P.

The display section 503 causes the display 411 to display a plurality of (for example, four) front-side preview images PVU side by side in a specific direction D1. Specifically, the display section 503 causes front-side preview images 710, 730, 750, and 770 to be displayed in a state arranged side by side in the specific direction D1. The specific direction D1 in the embodiment of the present disclosure indicates order in which images represented by the respective preview images are to be formed. Specifically, the display section 503 arranges the front-side preview images PVU in the specific direction D1 in the order in which images represented by the respective front-side preview images PVU are to be formed. That is, the display section 503 causes respective preview images corresponding to a first sheet P1, a second sheet P2, a third sheet P3, and a fourth sheet P4 of the paper to be displayed in the stated order in the specific direction D1.

As illustrated in FIG. 5A, the front-side preview images 710, 730, 750, and 770 are displayed on the preview screen 700 in a state arranged in the specific direction D1. An image represented by the front-side preview image 710 is to be formed on a front side of the first sheet P1 of the paper. An image represented by the front-side preview image 730 is to be formed on a front side of the second sheet P2 of the paper. An image represented by the front-side preview image 750 is to be formed on a front side of the third sheet P3 of the paper. An image represented by the front-side preview image 770 is to be formed on a front side of the fourth sheet P4 of the paper.

The front-side preview images 710, 730, 750, and 770 are each an example of the front-side preview image PVU. The front-side preview image 710 corresponds to the image information MJ of the first sheet of the document R. The front-side preview image 730 corresponds to the image information MJ of the third sheet of the document R. The front-side preview image 750 corresponds to the image information MJ of the fifth sheet of the document R. The front-side preview image 770 corresponds to the image information MJ of the seventh sheet of the document R.

The front-side preview image 710 includes a page number image 711 and a document image 712. The front-side preview image 730 includes a page number image 731 and a document image 732. The front-side preview image 750 includes a page number image 751 and a document image 752. The front-side preview image 770 includes a page number image 771 and a document image 772.

The page number image 711 is an image representing "1" and indicates that the front-side preview image 710 corresponds to the image information MJ of the first sheet of the document R. The document image 712 represents a title "Spring". The document image 712 is an example of the front-side image MU.

The page number image 731 is an image representing "3" and indicates that the front-side preview image 730 corresponds to the image information MJ of the third sheet of the document R. The document image 732 represents a title "Autumn". The document image 732 is an example of the front-side image MU.

The page number image 751 is an image representing "5" and indicates that the front-side preview image 750 corresponds to the image information MJ of the fifth sheet of the document R. The document image 752 represents a title "Eurasia". The document image 752 is an example of the front-side image MU.

The page number image 771 is an image representing "7" and indicates that the front-side preview image 770 corresponds to the image information MJ of the seventh sheet of the document R. The document image 772 represents a title "North America". The document image 772 is an example of the front-side image MU.

When the user performs the long press operation OP on the front-side preview image 730 for example with the forefinger of the hand H, the receiving section 502 receives the long press operation OP. Then, the display section 503 causes the display 411 to display a back-side preview image PVD instead of the front-side preview image PVU.

As a result, a back-side preview image 740 is displayed on the preview screen 700 instead of the front-side preview image 730, as illustrated in FIG. 5B. Specifically, a back-side image MD represented by the back-side preview image 740 and a front-side image MU represented by the front-side preview image 730 are to be formed on the same sheet of the paper P. That is, the back-side image MD represented by the back-side preview image 740 is paired with the front-side image MU represented by the front-side preview image 730. The back-side preview image 740 is an example of the back-side preview image PVD. The back-side preview image 740 includes a page number image 741 and a document image 742.

The page number image 741 is an image representing "4" and indicates that the back-side preview image 740 corresponds to the image information MJ of the fourth sheet of the document R. The document image 742 represents a title "Winter". The document image 742 is an example of the back-side image MD. The page number image 741 and the document image 742 represent "mirrored characters".

When the user terminates the long press operation OP by removing the forefinger from the back-side preview image 740, the receiving section 502 receives the termination of the long press operation OP. Then, the display section 503 causes the display 411 to display the front-side preview image 730 paired with the back-side preview image 740 instead of the back-side preview image 740. As a result, the front-side preview image 730 illustrated in FIG. 5A is displayed on the preview screen 700.

As described above with reference to FIGS. 1 to 5B, the display section 503 in the embodiment of the present disclosure causes the display 411 to display a plurality of front-side preview images PVU arranged side by side in the specific direction D1. Further, when the receiving section 502 receives the long press operation OP performed on one of the plurality of front-side preview images PVU, the display section 503 performs the following processing. That is, the display section 503 causes the display 411 to display a back-side preview image PVD paired with the one front-side preview image PVU instead of the one front-side preview image PVU. Thus, the front-side preview image PVU and the back-side preview image PVD can be checked easily for each of plural sheets of the paper P. Through the above, user friendliness can be improved.

Although the receiving section 502 receives the long press operation OP performed on the one front-side preview image 730 in the embodiment of the present disclosure, the present disclosure is not limited to this configuration. It is only required that the receiving section 502 receives the long press operation OP performed on at least one front-side preview image PVU. In an alternative configuration, the receiving section 502 may for example concurrently receive long press operations OP performed on two front-side preview images PVU (the front-side preview image 730 and the front-side preview image 750). In this configuration, the back-side preview image 740 paired with the front-side preview image 730 and a back-side preview image 760 paired with the front-side preview image 750 can be checked simultaneously. The back-side preview image 760 corresponds to the image information MJ of the sixth sheet of the document R. Through the above, user friendliness can be further improved.

Figure 6:
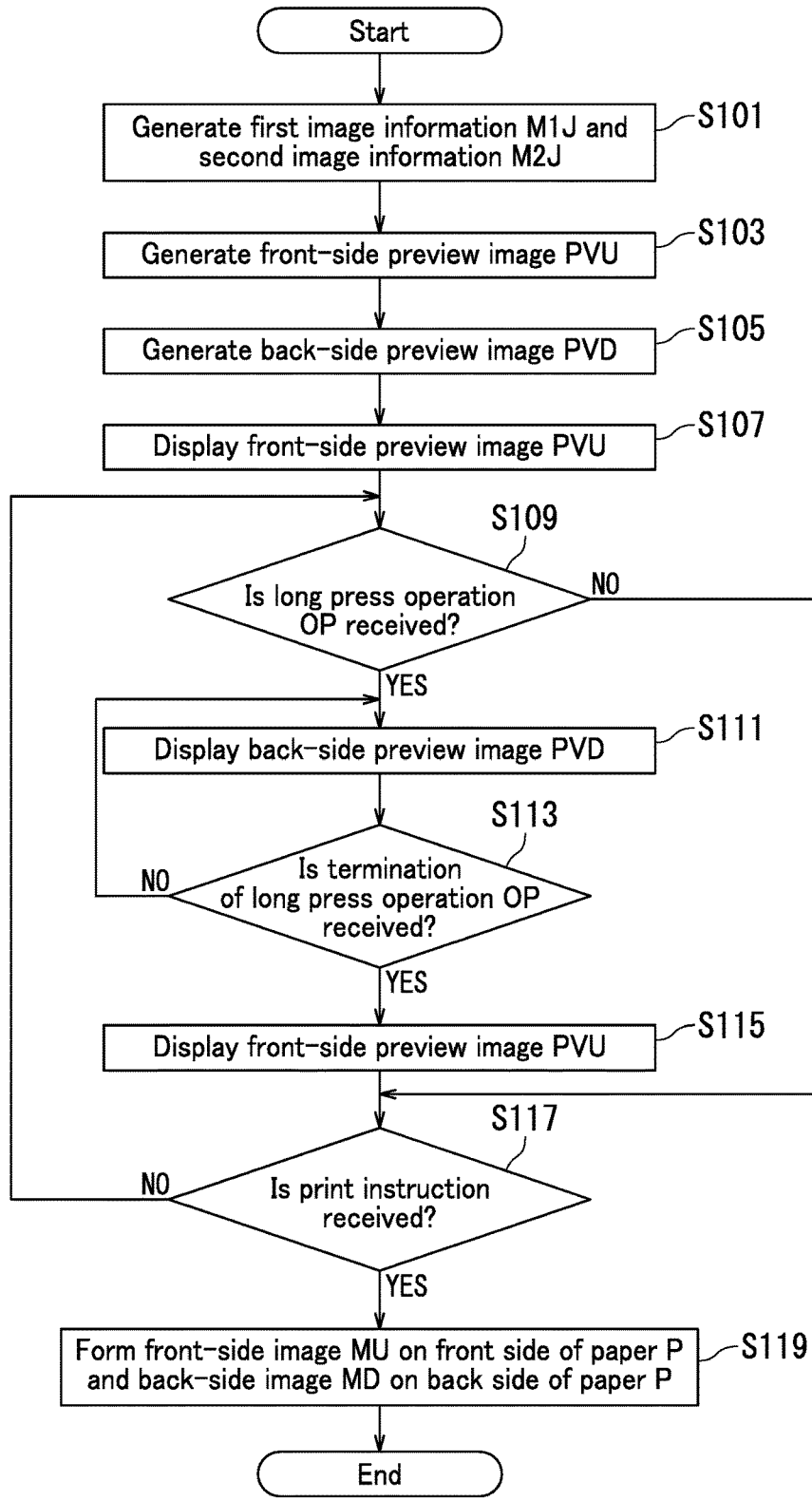
FIG. 6 is a flowchart illustrating an example of processing performed by the controller.

The following describes processing performed by the controller 5 with reference to FIGS. 1 to 6. FIG. 6 is a flowchart illustrating an example of the processing performed by the controller 5. The following describes with reference to FIG. 6 a situation in which images of two sheets of the document R are to be formed on the paper P.

As illustrated in FIG. 6, at step S101, the reading section 501 first reads the images of the two sheets of the document R to generate first image information M1J and second image information M2J.

Next at step S103, the controller 5 generates a front-side preview image PVU. The front-side preview image PVU corresponds to an image of the first sheet of the document R.

Next at step S105, the controller 5 generates a back-side preview image PVD. The back-side preview image PVD corresponds to an image of the second sheet of the document R.

At step S107, the display section 503 causes the display 411 to display the front-side preview image PVU.

Next at step S109, the receiving section 502 determines whether or not the long press operation OP is received.

When the receiving section 502 determines that the long press operation OP is not received (NO at step S109), the processing proceeds to step S117. When the receiving section 502 determines that the long press operation OP is received (YES at step S109), the processing proceeds to step S111.

At step S111, the display section 503 causes the display 411 to display the back-side preview image PVD instead of the front-side preview image PVU.

Next at step S113, the receiving section 502 determines whether or not termination of the long press operation OP is received.

When the receiving section 502 determines that termination of the long press operation OP is not received (NO at step S113), the processing returns to step S111. When the receiving section 502 determines that termination of the long press operation OP is received (YES at step S113), the processing proceeds to step S115.

At step S115, the display section 503 causes the display 411 to display the front-side preview image PVU instead of the back-side preview image PVD.

Next at step S117, the instruction section 504 determines whether or not a print instruction is received from the user.

When the instruction section 504 determines that the print instruction is not received from the user (NO at step S117), the processing returns to step S109. When the instruction section 504 determines that the print instruction is received from the user (YES at step S117), the processing proceeds to step S119.

At step S119, the instruction section 504 instructs the image forming unit 1 to form the front-side image MU on the front side of the paper P and form the back-side image MD on the back side of the paper P. The processing ends then.

Step S107 corresponds to "causing the display to display a front-side preview image". Step S109 corresponds to "receiving a first operation". Step S111 corresponds to "causing the display to display a back-side preview image".

As described above with reference to FIGS. 1 to 6, when images are to be formed on respective opposite sides of the paper P, the user can easily check the front-side preview image PVU and the back-side preview image PVD in the embodiment of the present disclosure. Therefore, the front-side image MU and the back-side image MD can be formed as intended by the user on the respective opposite sides of the paper P.

Through the above, the embodiment of the present disclosure has been described with reference to the drawings. However, the present disclosure is not limited to the above-described embodiment, and is practicable in various manners (for example, as described below in sections (1) to (4)) within a scope not departing from the gist of the present disclosure. The drawings schematically illustrate elements of configuration in order to facilitate understanding, and properties of the elements of configuration illustrated in the drawings, such as thicknesses, lengths, and numbers thereof, may differ from actual properties thereof in order to facilitate preparation of the drawings. Furthermore, properties of the elements of configuration described in the above embodiment, such as shapes and dimensions, are merely examples and are not intended as specific limitations. Various alterations may be made within a scope not substantially departing from the configuration of the present disclosure.

(1) As described above with reference to FIGS. 1 to 3, the image forming apparatus 100 in the embodiment of the present disclosure corresponds to the display control device. However, the present disclosure is not limited to this configuration. It is only required that the display control device includes the display 411 and the controller 5. The display control device may for example be a smartphone communicatively connected to the image forming apparatus 100. In another configuration, the display control device may for example be a personal computer communicatively connected to the image forming apparatus 100.

(2) As described above with reference to FIGS. 1 to 3, the receiving section 502 in the embodiment of the present disclosure receives a specific operation through the touch panel 41. However, the present disclosure is not limited to this configuration. It is only required that the receiving section 502 receives the specific operation. In an alternative configuration, the receiving section 502 may receive the specific operation for example through a mouse. In another configuration, the receiving section 502 may receive the specific operation for example through a keyboard.

(3) As described above with reference to FIGS. 1 to 5B, the display section 503 causes the plurality of front-side preview images PVU to be displayed in a state arranged in the specific direction D1. However, the present disclosure is not limited to this configuration. In an alternative configuration, the display section 503 may cause another front-side preview image PVU to be displayed instead of a currently displayed front-side preview image PVU for example when the receiving section 502 receives a slide operation. Specifically, when the receiving section 502 receives a leftward slide operation, the display section 503 causes a subsequent front-side preview image PVU to be displayed instead of the currently displayed front-side preview image PVU. For example, the front-side preview image 730 is displayed instead of the front-side preview image 710. The leftward slide operation is an example of a "third operation". Leftward is an example of "toward a first direction". When the receiving section 502 receives a rightward slide operation, the display section 503 causes a preceding front-side preview image PVU to be displayed instead of the currently displayed front-side preview image PVU. For example, the front-side preview image 710 is displayed instead of the front-side preview image 730. The rightward slide operation is an example of a "fourth operation". Rightward is an example of "toward a second direction".

(4) As described above with reference to FIGS. 1 to 5B, the display section 503 causes display of the back-side preview image PVD representing an image inverted horizontally rather than vertically. However, the present disclosure is not limited to this configuration. In a configuration, the display section 503 may perform the following processing for example when a swipe operation is performed by the user while the finger is kept in contact with a displayed back-side preview image PVD representing an image inverted horizontally rather than vertically. The swipe operation is an example of a "second operation". That is, in response to the swipe operation, the display section 503 may cause display of a back-side preview image PVD representing an image that is not inverted horizontally, instead of the back-side preview image PVD representing the image inverted horizontally rather than vertically.

What is claimed is:

1. A display control device that displays preview images representing respective images to be formed on a front side and a back side of a recording medium, the display control device comprising:
   a display;
   a display section configured to cause the display to display one of a plurality of front-side preview images each representing a front-side image to be formed on a front side of one of plural sheets of the recording medium;
   a touch sensor; and
   a receiving section configured to receive a first operation through the touch sensor, wherein
   when the receiving section receives the first operation performed on the one of the plurality of front-side preview images, the display section causes the display to display a back-side preview image representing a back-side image to be formed on the back side of the recording medium, instead of the one of the plurality of front-side preview images, the back-side preview image being paired with the one of the plurality of front-side preview images and representing the back-side image as seen from the front side of the recording medium through the recording medium,
   when the receiving section receives a second operation performed on the one of the plurality of front-side preview images, the display section causes the display to display a front-side preview image subsequent to the one of the plurality of front-side preview images, instead of the one of the plurality of front-side preview images,
   when the receiving section receives a third operation performed on the one of the plurality of front-side preview images, the display section causes the display to display a front-side preview image preceding to the one of the plurality of front-side preview images, instead of the one of the plurality of front-side preview images,
   the receiving section receives through the touch sensor an operation toward a first direction as the second operation,
   the receiving section receives through the touch sensor an operation toward a second direction as the third operation, the second direction being different from the first direction,
   the second operation is different from the first operation, and
   the third operation is different from the first operation and the second operation.

2. The display control device according to claim 1, wherein
   the receiving section receives through the touch sensor a long press operation or a force touch operation as the first operation.

3. The display control device according to claim 1, wherein
   the receiving section receives termination of the first operation, and
   when the receiving section receives the termination of the first operation, the display section causes the display to display the one of the plurality of front-side preview images.

4. The display control device according to claim 1, wherein
   the receiving section receives a fourth operation subsequently to the first operation, the fourth operation being different from the first operation, the second operation, and the third operation, and
   when the receiving section receives the fourth operation, the display section causes the display to display the back-side image as seen from the back side of the recording medium as the back-side preview image.

5. The display control device according to claim 1, wherein
   the display section causes the display to display a plurality of front-side preview images each representing a front-side image to be formed on a front side of one of plural sheets of the recording medium, the plurality of front-side preview images being arranged side by side in a specific direction,
   the receiving section receives the first operation performed on one of the plurality of front-side preview images, and
   when the receiving section receives the first operation performed on the one of the plurality of front-side preview images, the display section causes the display to display a back-side preview image paired with the one of the plurality of front-side preview images, instead of the one of the plurality of front-side preview images.

6. The display control device according to claim 1, wherein
   the second direction is opposite to the first direction.

7. A display control method for causing by a display control device a display to display preview images representing respective images to be formed on a front side and a back side of a recording medium, the display control method comprising:
   causing the display to display one of a plurality of front-side preview images each representing a front-side image to be formed on a front side of one of plural sheets of the recording medium;
   receiving an operation through a touch sensor;
   after receiving a first operation performed on the one of the plurality of front-side preview images, causing the display to display a back-side preview image representing a back-side image to be formed on the back side of the recording medium, instead of the one of the plurality of front-side preview images, the back-side preview image being paired with the one of the plurality of front-side preview images and representing the back-side image as seen from the front side of the recording medium through the recording medium, after receiving a second operation performed on the one of the plurality of front-side preview images, causing the display to display a front-side preview image subsequent to the one of the plurality of front-side preview images, instead of the one of the plurality of front-side preview images; and after receiving a third operation performed on the one of the plurality of front-side preview images, causing the display to display a front-side preview image preceding to the one of the plurality of front-side preview images, instead of the one of the plurality of front-side preview images, wherein the second operation is an operation performed toward a first direction and received through the touch sensor, the third operation is an operation performed toward a second direction and received through the touch sensor, the second direction being different from the first direction, the second operation is different from the first operation, and the third operation is different from the first operation and the second operation.

8. An image forming apparatus that displays preview images representing respective images to be formed on a front side and a back side of a recording medium, the image forming apparatus comprising:

a display;

a display section configured to cause the display to display one of a plurality of front-side preview images each representing a front-side image to be formed on a front side of one of plural sheets of the recording medium;

a touch sensor;

a receiving section configured to receive a first operation through the touch sensor; and an image forming device configured to form the front-side image on the front side of the recording medium and form a back-side image on the back side of the recording medium, wherein when the receiving section receives the first operation performed on the one of the plurality of front-side preview images, the display section causes the display to display a back-side preview image representing the back-side image instead of the one of the plurality of front-side preview images, the back-side preview image being paired with the one of the plurality of front-side preview images and representing the back-side image as seen from the front side of the recording medium through the recording medium, when the receiving section receives a second operation performed on the one of the plurality of front-side preview images, the display section causes the display to display a front-side preview image subsequent to the one of the plurality of front-side preview images, instead of the one of the plurality of front-side preview images, when the receiving section receives a third operation performed on the one of the plurality of front-side preview images, the display section causes the display to display a front-side preview image preceding to the one of the plurality of front-side preview images, instead of the one of the plurality of front-side preview images, the receiving section receives through the touch sensor an operation toward a first direction as the second operation, the receiving section receives through the touch sensor an operation toward a second direction as the third operation, the second direction being different from the first direction, the second operation is different from the first operation, and the third operation is different from the first operation and the second operation.

* * * * *